(12) United States Patent
Xia et al.

(10) Patent No.: US 8,077,814 B2
(45) Date of Patent: *Dec. 13, 2011

(54) PREAMBLE ACQUISITION WITHOUT SECOND ORDER TIMING LOOPS

(75) Inventors: Haitao Xia, Santa Clara, CA (US);
Shih-Ming Shih, San Jose, CA (US);
Ryan Yu, Sunnyvale, CA (US); Marcus Marrow, Santa Clara, CA (US); Kai Keung Chan, Fremont, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,043

(22) Filed: Dec. 3, 2010

(65) Prior Publication Data

US 2011/0075779 A1    Mar. 31, 2011

Related U.S. Application Data

(63) Continuation of application No. 11/784,195, filed on Apr. 4, 2007, now Pat. No. 7,869,547.

(60) Provisional application No. 60/901,922, filed on Feb. 15, 2007.

(51) Int. Cl.
*H04L 27/06*    (2006.01)

(52) U.S. Cl. ........................................ 375/344; 375/339
(58) Field of Classification Search .................. 375/344, 375/339, 316, 327
See application file for complete search history.

(56) References Cited

U.S. PATENT DOCUMENTS

| | | | |
|---|---|---|---|
| 6,252,733 B1 * | 6/2001 | Staszewski | 360/51 |
| 6,693,872 B1 * | 2/2004 | Brewen et al. | 369/124.02 |
| 7,869,547 B1 * | 1/2011 | Xia et al. | 375/344 |
| 2006/0256464 A1 * | 11/2006 | Ozdemir | 360/46 |

* cited by examiner

*Primary Examiner* — Emmanuel Bayard
(74) *Attorney, Agent, or Firm* — Van Pelt, Yi & James LLP (57) ABSTRACT

A clock is adjusted by obtaining a first plurality of samples and a second plurality of samples associated with a preamble portion of a data packet. The first plurality of samples and the second plurality of samples are sampled using a clock. A first intermediate value is determined based at least in part on the first plurality of samples and a second intermediate value is determined based at least in part on the second plurality of samples. An ending value associated with an end of the preamble portion is determined based at least in part on the first intermediate value and the second intermediate value. The clock is adjusted based at least in part on the ending value without use of a second order timing loop.

22 Claims, 9 Drawing Sheets

FIG. 1A

Preamble

PREAMBLE ACQUISITION WITHOUT SECOND ORDER TIMING LOOPS

CROSS REFERENCE TO OTHER APPLICATIONS

This application is a continuation of co-pending U.S. patent application Ser. No. 11/784,195, entitled PREAMBLE ACQUISITION WITHOUT SECOND ORDER TIMING LOOPS filed Apr. 4, 2007 which is incorporated herein by reference for all purposes, which claims priority to U.S. Provisional Application No. 60/901,922, entitled ZERO PHASE/FREQUENCY START TIMING ACQUISITION IN DATA STORAGE DEVICES filed Feb. 15, 2007 which is incorporated herein by reference for all purposes.

BACKGROUND OF THE INVENTION

Acquisition is an important process, for example when reading back information stored on a magnetic disk. Improving the performance of an acquisition process tends to cause an increase in the overall performance of a disk drive system. Disk drive systems are tending to use smaller geometries (e.g., spacing between tracks on a disk are getting closer) and are increasingly used in portable or handheld devices (e.g., thus increasing the amount of shaking a disk drive system experiences). In some cases, existing acquisition techniques do not (or soon will not) have sufficient performance to address these trends. It would be desirable if acquisition techniques with improved performance could be developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
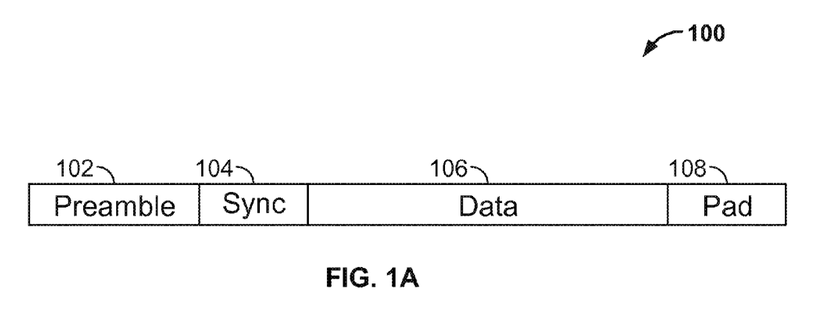
FIG. 1A is a diagram illustrating an embodiment of a data structure.

FIG. 1A is a diagram illustrating an embodiment of a data structure. In some embodiments, data structure 100 is a segment associated with the storage of data, for example on a magnetic disk. In some storage applications, acquisition is performed using and/or during preamble 102. During acquisition, the phase and/or frequency of a sampling clock is adjusted and the adjusted clock is used to read data stored in data portion 106. Sync 104 and pad 108 are associated with overhead and in some cases are used to indicate the start of the data portion and close out a Viterbi decoder, respectively. In some embodiments, a data structure includes different portions than the example shown herein. P It would be desirable to improve the performance of an acquisition process. For example, with better acquisition, less noise will be introduced when reading data stored in data portion 106, possibly resulting in fewer errors and/or requiring fewer error correction resources. In some embodiments, acquisition techniques disclosed herein are used in some other application besides data storage (e.g., wired or wireless data communication between two devices).

Figure 1B:
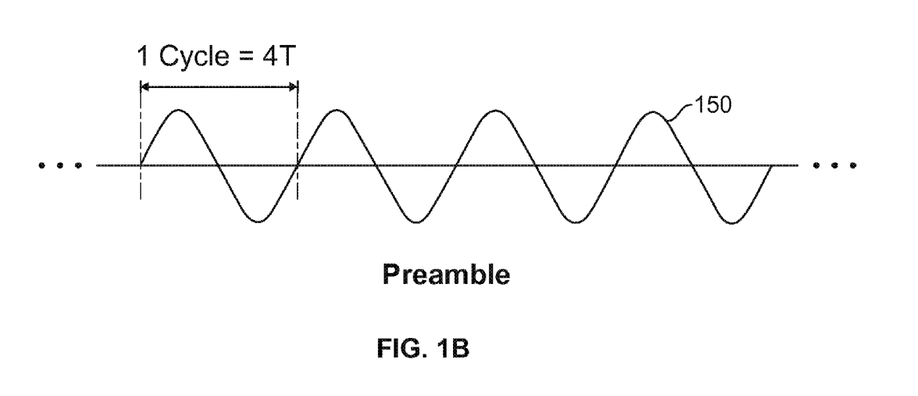
FIG. 1B is a diagram illustrating an embodiment of a preamble.

FIG. 1B is a diagram illustrating an embodiment of a preamble. In the example shown, preamble signal 150 is an analog, sinusoidal signal. In some embodiments, preamble 102 is implemented as preamble signal 150. In various embodiments, any appropriate preamble signal may be used. As used herein, one cycle of a preamble signal is equal to 4 T.

Figure 2A:
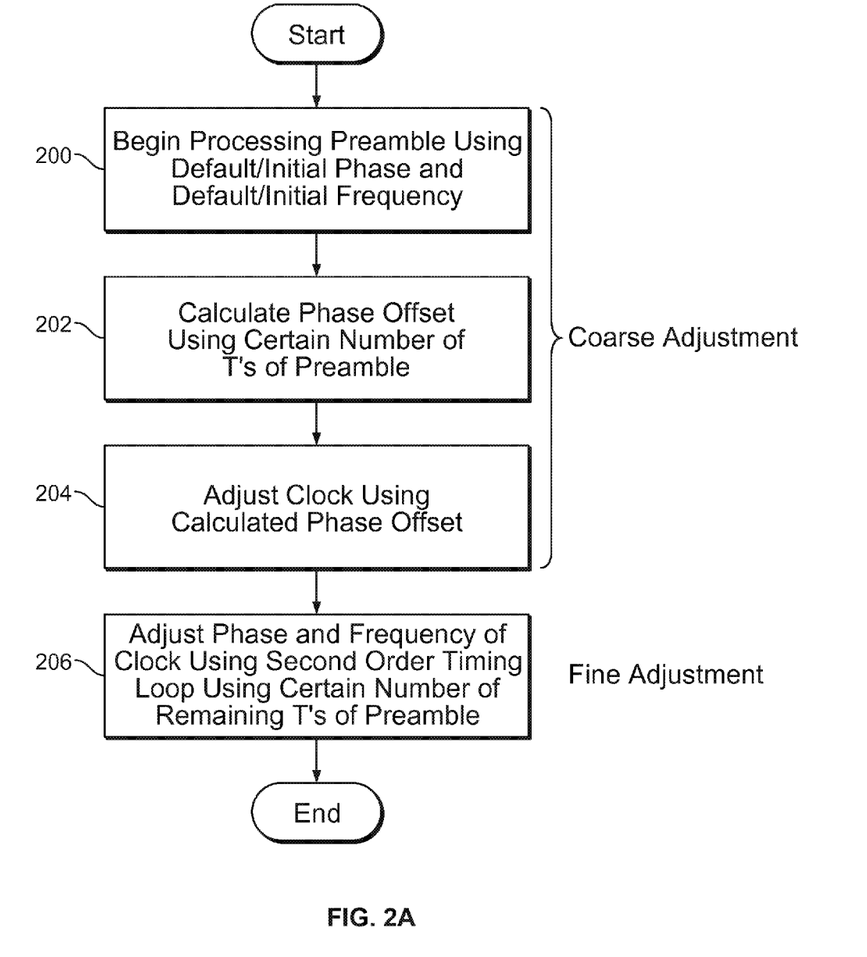
FIG. 2A is a diagram illustrating an example of some other process for performing acquisition.

FIG. 2A is a diagram illustrating an example of some other process for performing acquisition. In the example shown, acquisition is divided into two general portions: coarse adjustment and fine adjustment. Steps 200-204 correspond to coarse adjustment and step 206 corresponds to fine adjustment.

Processing of a preamble begins using a default/initial phase and a default/initial frequency at 200. At 202, a phase offset is calculated using a certain number of T's of a preamble. As used herein, an offset refers to an amount of correction (e.g., that is applied to a sampling clock).

One technique for calculating a phase offset is to use an arctangent. For example, using a sampling clock, four samples having values of $A\sin(\theta)$, $A\cos(\theta)$, $-A\sin(\theta)$, and $-A\cos(\theta)$ are obtained. From these values:

$$yy = A\sin(\theta) - (-A\sin(\theta)) = 2A\sin(\theta)$$

$$xx = A\cos(\theta) - (-A\cos(\theta)) = 2A\cos(\theta)$$

$$yy/xx = \tan(\theta), \text{ which corresponds to: } \theta = \arctan(yy/xx)$$

At 204, a clock is adjusted using a calculated phase offset. In some cases, adjusting the clock in this manner is referred to as a zero phase restart. At 206, a phase and a frequency of a clock are adjusted using a second order timing loop using a certain number of remaining T's of preamble. In some cases, a second order timing loop introduces noise into a system.

Figure 2B:
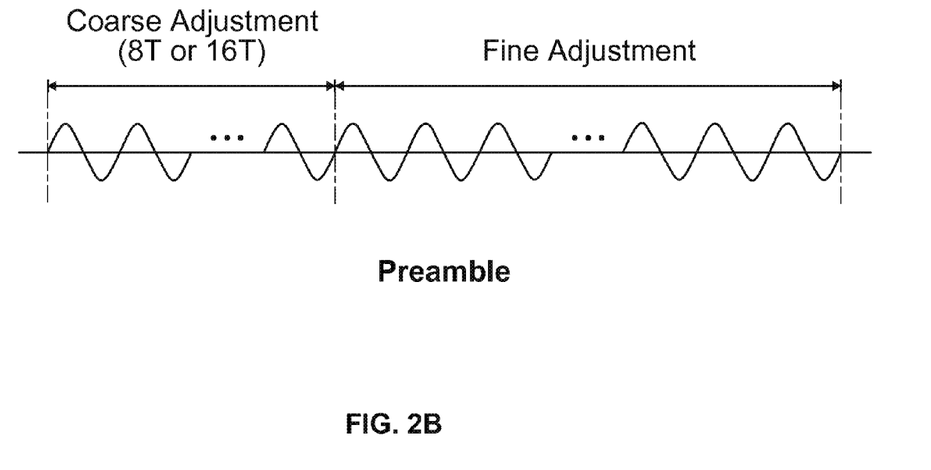
FIG. 2B is a diagram illustrating an example of the number of cycles of a preamble used to perform coarse and fine adjusting using some other acquisition process.

FIG. 2B is a diagram illustrating an example of the number of cycles of a preamble used to perform coarse and fine adjusting using some other acquisition process. In the example shown, coarse adjustment and fine adjustment correspond to the steps shown in FIG. 2A. The number of cycles shown in this example is representative and the exact number of cycles in a preamble and/or used to perform coarse or fine adjustment may vary.

In the example shown, a relatively small portion of the preamble is used to perform coarse adjustment. For example, some other acquisition processes may only use 8 T or 16 T of the preamble to calculate and adjust the phase during coarse adjustment. In some cases this is undesirable since this is a relatively small portion of the preamble (e.g., a total preamble length may be on the order of hundreds of T) and statistically it may be desirable to use a larger sampling size.

What is disclosed is an acquisition technique that overcomes some drawbacks associated with previous methods. In some embodiments, acquisition is performed without the use of a second order feedback loop. In some embodiments, linear regression (e.g., using data associated with most or all of a preamble) is used to calculate a phase and/or frequency offset and correction is applied at or near the end of the preamble. In some embodiments, correction is applied slowly or gradually over a period of time, for example at various points or times in a preamble. In some embodiments, all or most of the samples are used and the adjustment is done from a global point of view and/or is a system that has memory or otherwise remembers. Such embodiment may be in contrast to some other techniques where, for example, coarse and fine adjustment is based on several current samples and adjustment is done in a local and/or memoryless manner.

Figure 3A:
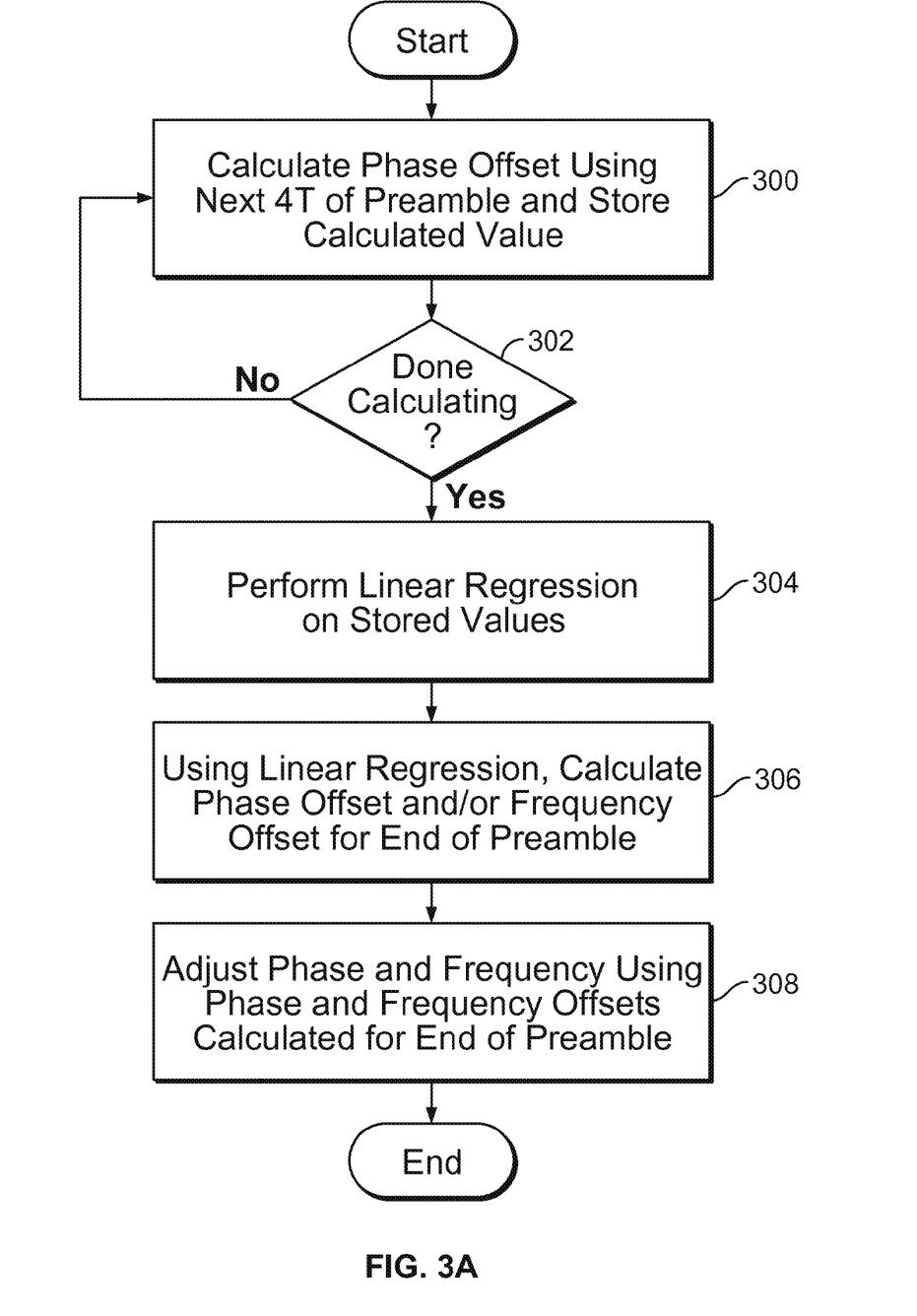
FIG. 3A is a diagram illustrating an embodiment of a process for performing acquisition in which phase and frequency offsets are calculated for the end of a preamble.

FIG. 3A is a diagram illustrating an embodiment of a process for performing acquisition in which phase and frequency offsets are calculated for the end of a preamble. In the example shown, more of a preamble is used to calculate phase and/or frequency offset compared to some other techniques. In some embodiments, some other technique is used besides the example process shown. For example, in some other embodiments, correction or adjustment of phase and/or frequency is performed gradually or relatively slowly.

At 300, a phase offset is calculated using the (next) 4 T of a preamble and the calculated value is stored. For example, at the beginning of the process, a phase offset is calculated for the first four T of the preamble. In some embodiments, an arctangent lookup table (LUT) is used at 300. In some cases, using a LUT is attractive because it is faster and/or simpler than some other techniques. In some embodiments, the phase estimate is stored.

It is determined at 302 if calculating is done. This is performed in a variety of ways in various embodiments. In some embodiments, the part of a preamble for which phase offsets are calculated is based on the length of the preamble. For example, it may be unattractive to fix the part of the preamble used at step 300 if the length of the preamble is variable. In some embodiments, the part of a preamble for which phase offsets are calculated is some fixed or defined amount from the end of the preamble (e.g., length of preamble minus n). In some embodiments, a lookup table is used with predefined lengths/parts. For example, for preamble lengths of $[1, L_1)$ phase offsets are calculated for the first $k_1$ T, for preamble lengths of $[L_1, L_2)$ phase offsets are calculated for the first $k_2$ T, etc.

If calculating is not done, a phase offset is calculated using the next 4 T of the preamble at 300. In some embodiments, a phase offset is calculated at some other rate besides every 4 T (e.g., an integer multiple of 4 T). If calculation is done, linear regression is performed on the stored values at 304. Using the linear regression, an end phase offset and/or an end frequency offset is/are calculated for the end of a preamble at 306. At 308, phase and frequency are adjusted using the end phase and end frequency offsets calculated for the end of a preamble.

In some embodiments, the amount or portion of a preamble used to determine a phase offset is different from the amount or portion of a preamble used to determine a frequency offset at 306. For example, in some configurations a shared processor is used for phase and frequency. In some embodiments, a shared processor first calculates the phase offset and then the frequency offset, or the frequency first, then phase. In some embodiments, calculation is performed simultaneously and/or the portion of the preamble used to determine phase offset is the same as that used to determine frequency offset.

In some embodiments, an estimation is used at one or more of the steps described. For example, in some embodiments, an estimation is used to calculate the phase offset at 300. In some embodiments, a lookup table is used (e.g., to store pre-calculated arctangent values or data associated with linear regression).

In various embodiments, the example process is modified, augmented, or optimized as appropriate. For example, in some embodiments, a non-linear process is used instead of a linear process (e.g., using a curve to calculate or project what the phase and/or frequency offset will be at the end of the preamble). In some embodiments, a least mean squares (LMS) technique is used instead of linear regression.

Figure 3B:
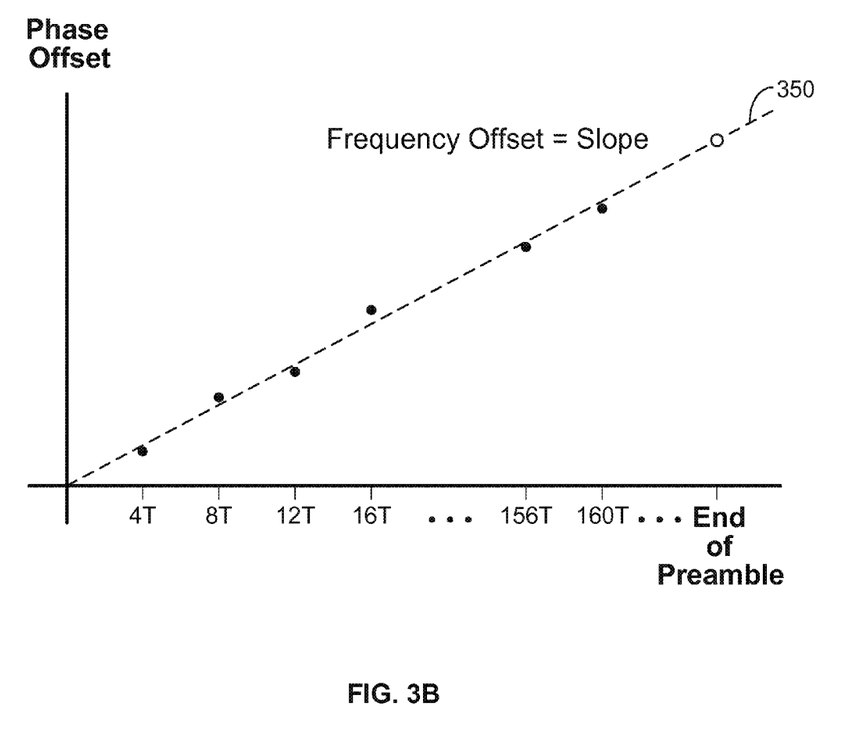
FIG. 3B is a graph showing an embodiment of an end phase offset and an end frequency offset that are determined using linear regression.

FIG. 3B is a graph showing an embodiment of an end phase offset and an end frequency offset that are determined using linear regression. In the example shown, example data for the process of FIG. 3A is shown. In the example shown, phase offsets are calculated every 4 T up to and including the $160^{th}$ T of the preamble; some number of T's after that the end of the preamble occurs. In some embodiments, a different number of samples is used in the linear regression.

Linear regression creates line 350. Using line 350, the phase offset at the end of the preamble may be extrapolated or predicted (e.g., before the end of the preamble actually occurs). In this example, the frequency offset is equivalent to the slope of line 350. In some embodiments, some other technique is used to determine a frequency offset besides using the slope of a line.

The end phase offset that is projected or extrapolated for the end of the preamble is used to correct a clock. In various embodiments, the time at which the correction is actually performed varies (e.g., prior to the end of the preamble, at the end of the preamble, during a SYNC portion, etc.) and the projected or extrapolated offset is calculated accordingly.

In some embodiments, phase unwrapping is performed prior to performing linear regression or some alternative process. For example, $2k\pi$ (where k is a positive or negative integer) may be added to a calculated phase offset as appropriate so that a linear regression process can be properly performed.

In some cases, the embodiments described in FIGS. 3A and 3B offer improved performance over some other existing techniques. For example, it may be possible to avoid the use of second order timing loops during acquisition. In some embodiments, second order timing loops are still used, but during other processes such as tracking during a data portion of a segment. In some embodiments, correction of phase and/or frequency is improved since a larger portion of the preamble is used to determine the frequency and/or phase offset.

Figure 4A:
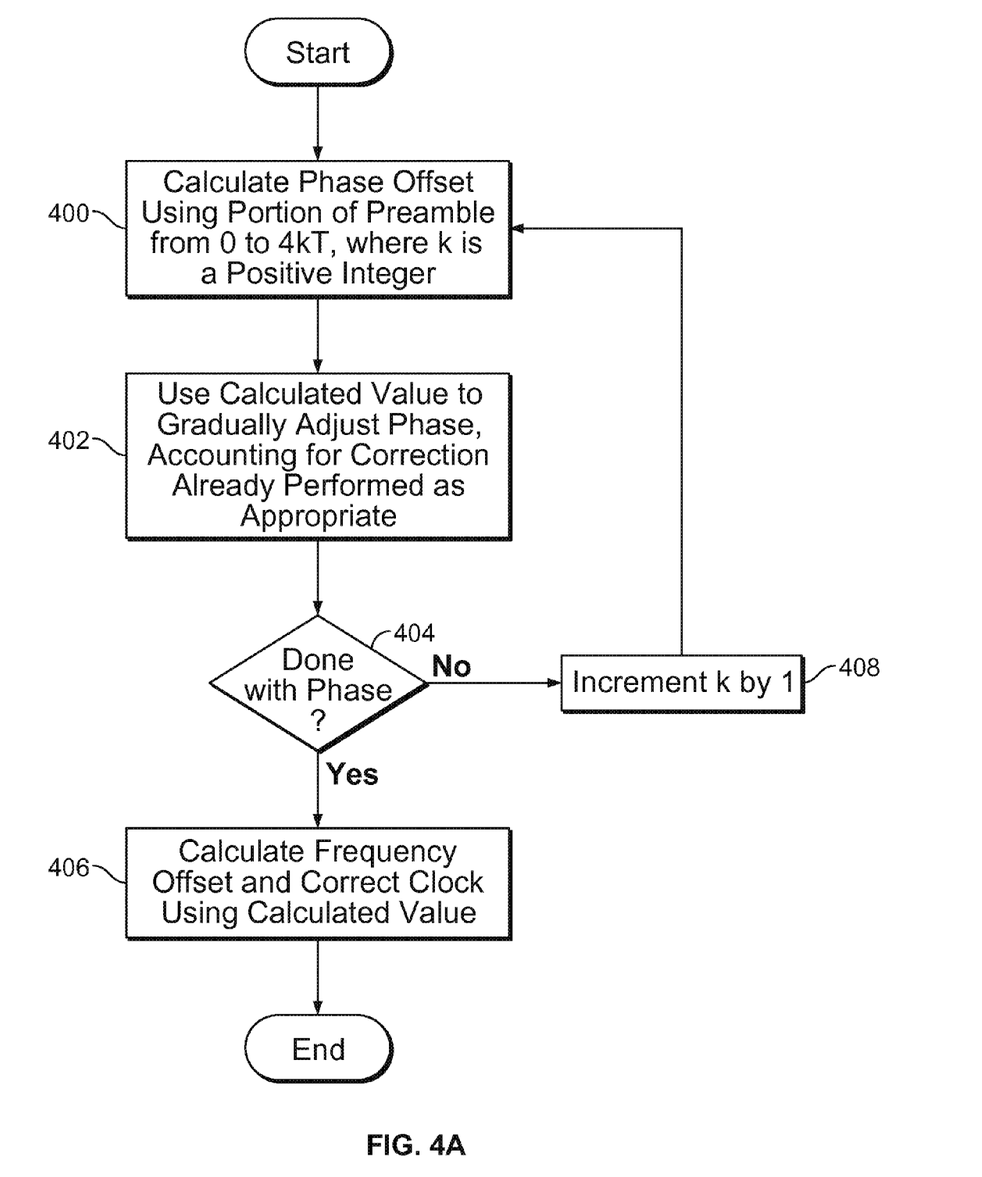
FIG. 4A is a flowchart illustrating an embodiment of a process for performing acquisition where the phase is adjusted gradually.

FIG. 4A is a flowchart illustrating an embodiment of a process for performing acquisition where the phase is adjusted gradually. The example process may have some or all of the benefits associated with the embodiments shown in FIGS. 3A and 3B. For example, using the example process, it may also be possible to avoid the use of a second order timing loop during acquisition and/or more of a preamble is used.

At 400, a phase offset is calculated using a portion of a preamble from 0 to 4 kT, where k is a positive integer. For example, at the first iteration, a phase offset is calculated using the portion of the preamble that corresponds to 0-4 T. At the second iteration, this would be from 0-8 T.

A calculated value is used to gradually adjust phase, accounting for correction already performed as appropriate at 402. One embodiment of this is described in further detail below, where phase is gradually adjusted by a fixed or predefined amount. In this example process, a phase offset calculated at a later iteration supersedes a phase offset calculated at an earlier iteration, and what is accounted for is the correction that has actually been applied or performed. Since the correction occurs gradually, in some cases, a previous correction has not fully completed by the time a subsequent iteration occurs; in other cases, correction is fully completed before the next iteration. As an example, it is determined at a first iteration that a phase offset of +5 needs to be applied. The correction is applied gradually, for example in units of +/−1. If at the second iteration, a correction of +4 has been accomplished and the phase offset determined at the second iteration is +6, a correction of +2 (i.e., +6 minus +4) is performed gradually. In some cases, a correction overshoot occurs, and correction or adjustment is performed in the opposite direction.

At 404 it is determined if phase is done. In some embodiments, some of the techniques described with respect to FIGS. 3A and 3B are used in this process. For example, in some embodiments a relatively large part of the preamble may be used to correct for phase and this varies depending upon the length of the preamble. If phase adjustment is done, a frequency offset is calculated and a clock is corrected using the calculated value at 406. In some embodiments, a frequency offset is calculated using techniques similar to those described with respect to FIGS. 3A and 3B (e.g., linear regression is performed using the phase offsets calculated at 400). If phase adjustment is not done, k is incremented by 1 at 408 and a phase offset is calculated at 400.

Figure 4B:
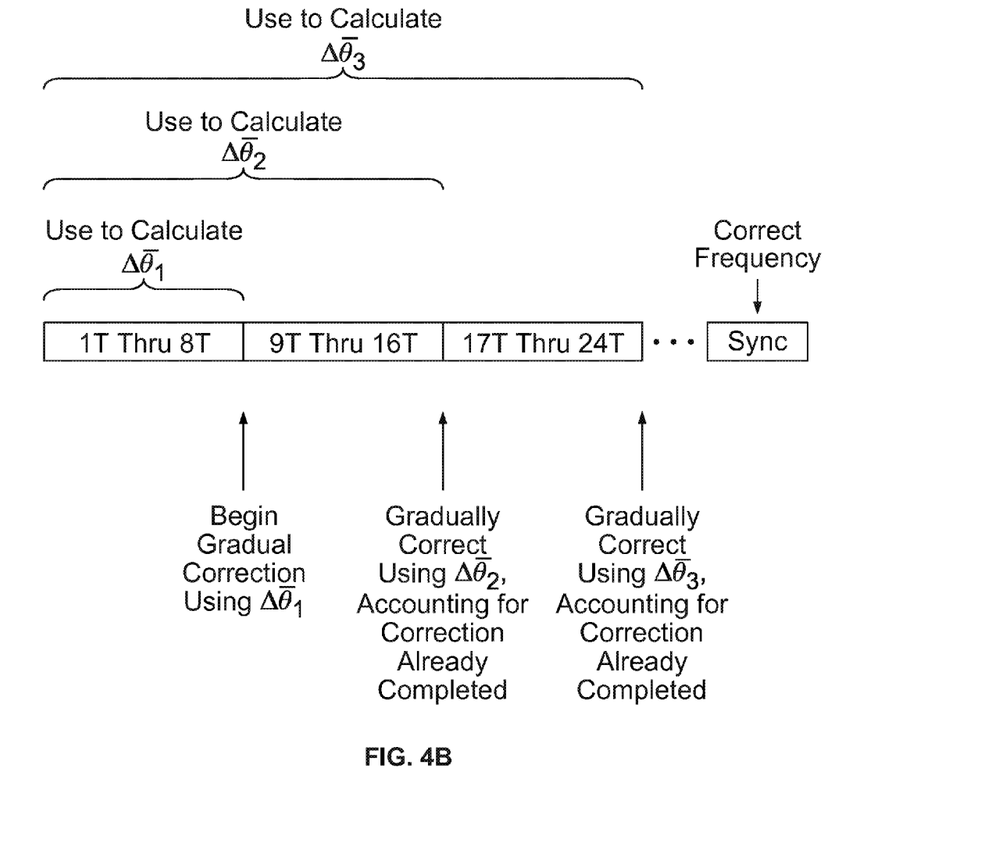
FIG. 4B is a diagram illustrating an embodiment of gradual corrections applied throughout a preamble.

FIG. 4B is a diagram illustrating an embodiment of gradual corrections applied throughout a preamble. The example of this figure corresponds to the process of FIG. 4A. In this example, a first phase offset (i.e., $\Delta\bar{\theta}_1$) is calculated using the first 8 T of the preamble. The second phase offset (i.e., $\Delta\bar{\theta}_2$) is calculated using the first 16 T of the preamble. Since the second phase offset uses more cycles or T than the first phase offset, it supersedes the first phase offset. In some cases, the entire $\Delta\bar{\theta}_1$ correction has been applied by the end of the $16^{th}$ T of the preamble. In other cases, there may yet be some correction remaining to be completed. The correction applied at the end of the $16^{th}$ T takes into account the correction already completed. Similarly, a third phase offset is calculated using the first 24 T of the preamble and the correction takes into account correction already completed. In some embodiments, this occurs for the first 100 T or first 160 T of the preamble. In some embodiments, actual correction of the phase extends past the preamble and does not complete until some subsequent portion (e.g., a sync portion or a data portion). In some embodiments, the time or point at which to calculate a first, second, third, etc. phase offset is programmable by user.

In this example, frequency is corrected during the sync portion. In some embodiments, frequency is corrected at some other point in time (e.g., during the preamble portion). Frequency may be corrected using any appropriate technique.

Figure 5:
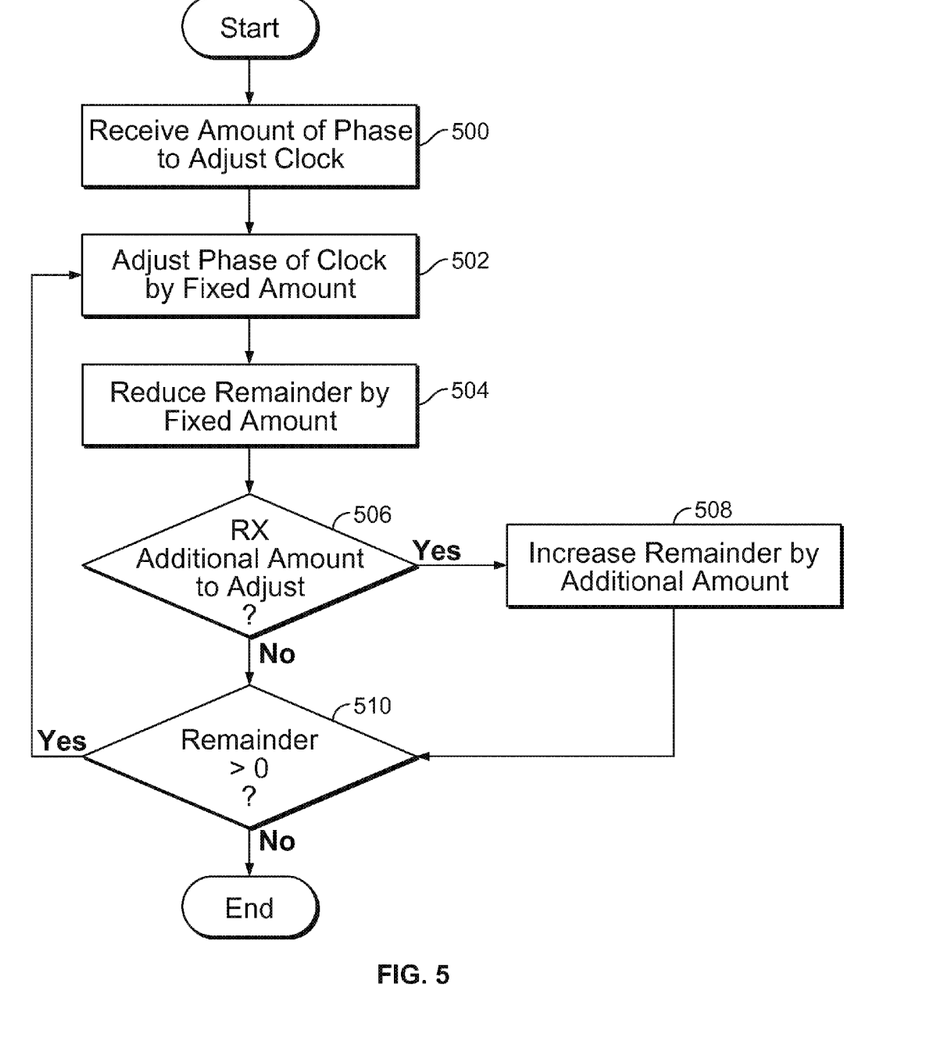
FIG. 5 is a flowchart illustrating an embodiment of a process for gradually adjusting phase.

FIG. 5 is a flowchart illustrating an embodiment of a process for gradually adjusting phase. In the example shown, the phase of a clock is adjusted gradually by fixed amount. For example, at a first point in time, the phase of the clocks is adjusted by X and at some time later, the clock is again adjusted by X. In some embodiments, the example process is used at step 402 of FIG. 4A. In some embodiments, some other process is used to gradually adjust the phase of a clock. For example, in some embodiments, a clock is adjusted in non-uniform amounts.

At 500, an amount of phase to adjust a clock is received. The phase of a clock is adjusted by a fixed amount at 502. In some embodiments, this fixed amount may be applied in the positive or negative direction, so that a clock's phase is able to be advanced or retarded a fixed amount. In various embodiments, a fixed amount of adjustment used at 502 is a configurable value (e.g., that can be set by firmware or software) and/or has a default value. A remainder is reduced by a fixed amount at 504. In this example, a remainder is used to track how much more correction is to be applied. Initially, the remainder is equal to an initial or first phase offset received at 500.

It is determined at 506 whether an additional amount to adjust has been received. For example, referring back to FIG. 4B, a correction correspond to the end of 8 T may have been received at 500 and at or before step 506, a correction corresponding to the end of 16 T has been received. If so, the remainder is increased by an additional amount at 508. For example, a phase offset of +5 is determined for 1 T thru 8 T and a phase offset of +6 is determined for 1 T thru 16 T; in some embodiments if the remainder is +1 (e.g., because only +4 of the desired +5 correction has actually been accomplished) the remainder is incremented by +1 (i.e., +6-+5) so that the remainder becomes +2.

After increasing the remainder at 508 or if no additional adjustment is received at 506, it is determined if the remainder is greater than zero at 510. If so, the phase of the clock is adjusted at 502 at a next iteration. In some embodiments, there is a fixed or uniform period of time between successive adjustments at step 502. In some embodiments, a comparison at 510 determines whether a remainder is not equal to zero. For example, in some cases if the remainder is a negative number, correction is performed in the opposite direction (e.g., compared to if the remainder is a positive number).

As mentioned above, in some embodiments linear regression is used. In various embodiments, information associated with the linear regression may be stored, organized, and/or calculated in a variety of ways. The following equations show some embodiments of linear regression related equations. As used herein, M is the number of cycles in a preamble and "‾" indicates an average or mean (i.e., $\overline{X}$ is the mean of X). In some embodiments, the frequency offset and phase offset can be written as:

$$\Delta f_{1T} = \frac{\overline{M-k} \times \overline{\phi(k)} - \overline{(M-k) \times \phi(k)}}{(\overline{M-k})^2 - \overline{M-k}^2} \quad (1)$$

$$\phi(M) = \overline{\phi(k)} + \overline{M-k} \times \Delta f_{1T} \quad (2)$$

In some embodiments, equations 1 and 2 are rewritten as:

$$\Delta f_{1T} = A \times \sum_{k=1}^{M}(k \times \phi(k)) + (-B) \times \sum_{k=1}^{M}(\phi(k)), \quad (3)$$

and $$\phi(M) = C \times \sum_{k=1}^{M}(k \times \phi(k)) + (-D) \times \sum_{k=1}^{M}(\phi(k)) \quad (4)$$

where the coefficients A, B, C, and D are:

$$A = \frac{3}{M \times (M^2 - 1)}, B = \frac{3}{2 \times M \times (M-1)},$$
$$C = \frac{6}{M \times (M+1)}, \text{ and } D = \frac{2}{M}.$$

In the examples shown, equations 1 and 2 can be rewritten as equations 3 and 4 or as equations 5 and 6. Equation 3 is equal to 5, and 4 equals to 6; only the coefficients A, B, C and D are different in the two set of equations in these particular embodiments. Equation 3 and 4 is straightforward: for each cycle (4 T), $\phi(k)$ and $k \times \phi(k)$ need to be computed. In some applications, equations 3 and 4 are unattractive because to compute $k \times \phi(k)$ a multiplier is needed, which is expensive in circuit design. In the examples of equations 5 and 6, the need for multipliers has been removed (e.g., according to the implementation in FIG. 6). Also, equations 5 and 6 take into account a priori information, which is more general case. In the example of equation 8, equation 8 is a simplified version of equation 6 if it is thought or known that the frequency offset of the system is small.

In some embodiments, a priori information is used in calculating a phase offset and/or frequency offset. For example, frequency offset and phase offset are calculated in some embodiments using:

$$\Delta f_{1T} = -A \times \sum_{k=0}^{M-1}((M-k) \times \phi(k)) + B \times \sum_{k=0}^{M-1}(\phi(k)), \quad (5)$$

and $$\phi(M) = -C \times \sum_{k=0}^{M-1}((M-k) \times \phi(k)) + D \times \sum_{k=0}^{M-1}(\phi(k)) \quad (6)$$

where the coefficients A, B, C, and D are:

$$A = \frac{3}{12 \times \left(\frac{\sigma_w}{\sigma_f}\right)^2 + M \times (M^2-1)},$$

$$B = \frac{3 \times (M-1)}{24 \times \left(\frac{\sigma_w}{\sigma_f}\right)^2 + 2 \times M \times (M^2-1)},$$

$$C = \frac{6 \times (M-1)}{12 \times \left(\frac{\sigma_w}{\sigma_f}\right)^2 + M \times (M^2-1)},$$

$$\text{and } D = \frac{12 \times \left(\frac{\sigma_w}{\sigma_f}\right)^2 - 2 \times M \times (M^2-1) + 6 \times M \times (M-1)}{M \times \left(12 \times \left(\frac{\sigma_w}{\sigma_f}\right)^2 + M \times (M^2-1)\right)}.$$

In some embodiments, $$\left(\frac{\sigma_w}{\sigma_f}\right)$$

is a priori information about noise obtained from channel estimation. In various embodiments, various techniques are used to obtain $$\left(\frac{\sigma_w}{\sigma_f}\right).$$

$\sigma_w$ and $\sigma_f$ are the standard deviation of the noise and the standard deviation of the frequency offset, respectively.

In some embodiments, using a priori information is better for shorter preambles compared to longer preambles. For example, some simulations indicate that for preambles of length 120 T or less, a priori information improves performance. For preamble lengths greater than 120 T, there may be little or no benefit. In some cases, a priori information is not available, and some embodiments are configured to use a priori information or not, for example based on the availability or accuracy of a priori information. In some embodiments, the usage of a priori information can be added in or removed relatively freely or easily using a programmable ABCD lookup table.

In some embodiments, a frequency offset and phase offset are calculated using equation 7 and 8 if it is thought or known that the frequency offset of the system is considerably small in order to simplify the phase offset estimation:

$$\Delta f_{1T} = -A \times \sum_{k=1}^{M}((M-k) \times \phi(k)) + B \times \sum_{k=1}^{M}(\phi(k)), \quad (7)$$

and $$\phi(M) \approx C \times \sum_{k=1}^{M}(\phi(k)) \quad (8)$$

where the coefficients A, B, and C are:

$$A = \frac{3}{12 \times \left(\frac{\sigma_w}{\sigma_f}\right)^2 + M \times (M^2 - 1)},$$

$$B = \frac{3 \times (M-1)}{24 \times \left(\frac{\sigma_w}{\sigma_f}\right)^2 + 2 \times M \times (M^2 - 1)},$$

$$\text{and } C = \frac{1}{M}.$$

In some embodiments, a LUT is used to obtain coefficients (e.g., A, B, C, and D in the above equations). In some embodiments, using a LUT (or other alternative) permits a variety of preamble lengths to be used, allowing some degree of flexibility. For example, the preamble length may be configurable depending upon the particular application or usage of a disk drive system using the techniques disclosed herein. In some embodiments, using a LUT permits easy usage (or not) of a priori information.

Figure 6:
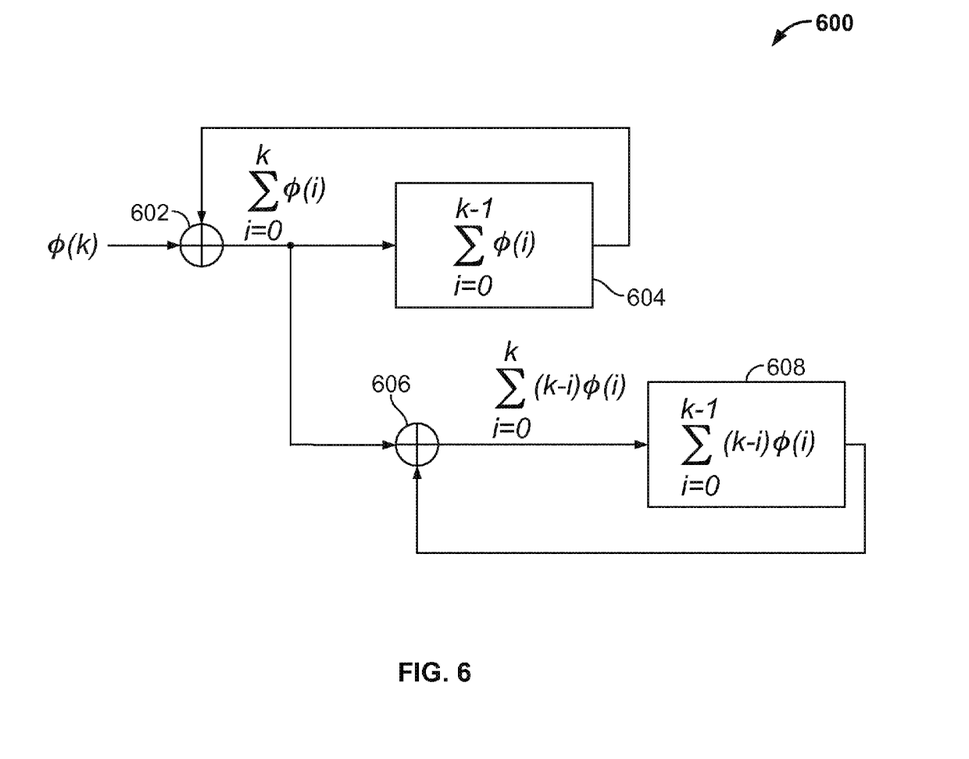
FIG. 6 is a diagram illustrating an embodiment of a circuit configured to compute $$\sum_{k=0}^{M-1} ((M-k) \times \phi(k)) \text{ and } \sum_{k=0}^{M-1} (\phi(k)).$$

FIG. 6 is a diagram illustrating an embodiment of a circuit configured to compute $$\sum_{k=0}^{M-1} ((M-k) \times \phi(k)) \text{ and } \sum_{k=0}^{M-1} (\phi(k)).$$

Circuit 100 is used to calculate a phase offset and/or a frequency offset in some embodiments. For example, equations 3-8 use one or both of the summations. In some embodiments, some other circuit is used to perform one or both of the summations.

In circuit 600, $\phi(k)$ is passed to adder 602, which combines this with the output of buffer 604. Buffer 604 may be any appropriate storage device that contains $$\sum_{i=0}^{k-1} \phi(i)$$

(e.g., registers in an application specific integrated circuit (ASIC)). The output of adder 602 is passed to both buffer 604 and adder 606. Adder 606 combines the output of adder 602 with the output of buffer 608. Buffer 608 is used to store $$\sum_{i=0}^{k-1} (k-i)\phi(i)$$

and may be any appropriate storage device. The output of adder 606 is passed to buffer 608.

Adders 602 and 606 output $$\sum_{i=0}^{k} \phi(i) \text{ and } \sum_{i=0}^{k} (k-i)\phi(i),$$

respectively. As $\phi(k)$ values are input to circuit 600, the outputs of adders 602 and 604 are updated until $$\sum_{k=0}^{M-1} (\phi(k)) \text{ and } \sum_{k=0}^{M-1} ((M-k) \times \phi(k))$$

are output by adders 602 and 604, respectively.

In some applications, circuit 600 is attractive because of the simplicity, size, and/or components used in circuit 600. For example, circuit 600 may be relatively small, fast, and/or inexpensive to build. In turn, this may contribute to the performance or appeal of a larger device or system that uses circuit 600, such as a disk drive system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for adjusting a clock, comprising:
   a processor configured to:
      obtain a first plurality of samples and a second plurality of samples associated with a preamble portion of a data packet, wherein the first plurality of samples and the second plurality of samples are sampled using a clock;
      determine a first intermediate value based at least in part on the first plurality of samples;
      determine a second intermediate value based at least in part on the second plurality of samples;
      determine an ending value associated with an end of the preamble portion based at least in part on the first intermediate value and the second intermediate value; and
      adjust the clock based at least in part on the ending value without use of a second order timing loop; and
   the clock configured to be adjusted by the processor.

2. The system of claim 1, wherein the system includes a magnetic disk storage system.

3. The system of claim 1 further comprising magnetic disk storage, wherein the data packet is stored on the magnetic disk storage.

4. The system of claim 1, wherein the processor is configured to determine the ending value using one or more of the following: linear regression or least mean squares (LMS).

5. The system of claim 1, wherein the processor is configured to determine the ending value by performing phase unwrapping so that a difference between the first intermediate value and the second intermediate value after phase unwrapping is a monotonic increase.

6. The system of claim 1, wherein the processor is configured to determine the ending value further based at least on part on an anticipated time at which the clock is to be adjusted.

7. The system of claim 1, wherein the processor is configured to adjust the clock by performing one or more of the following: adjusting a phase control associated with the clock or adjusting a frequency control associated with the clock.

8. The system of claim 1, wherein the processor is configured to adjust the clock by adjusting the clock at a first point in time and adjusting the clock at a second point in time.

9. A method for adjusting a clock, comprising:
   obtaining a first plurality of samples and a second plurality of samples associated with a preamble portion of a data packet, wherein the first plurality of samples and the second plurality of samples are sampled using a clock;
   using a processor to determine a first intermediate value based at least in part on the first plurality of samples;

using the processor to determine a second intermediate value based at least in part on the second plurality of samples;

using the processor to determine an ending value associated with an end of the preamble portion based at least in part on the first intermediate value and the second intermediate value; and adjusting the clock based at least in part on the ending value without use of a second order timing loop.

10. The method of claim 9, wherein the data packet is stored on magnetic disk storage.

11. The method of claim 9, wherein using the processor to determine the ending value includes using one or more of the following: linear regression or least mean squares (LMS).

12. The method of claim 9, wherein using the processor to determine the ending value includes performing phase unwrapping so that a difference between the first intermediate value and the second intermediate value after phase unwrapping is a monotonic increase.

13. The method of claim 9, wherein using the processor to determine the ending value is further based at least on part on an anticipated time at which the clock is to be adjusted.

14. The method of claim 9, wherein adjusting the clock includes performing one or more of the following: adjusting a phase control associated with the clock or adjusting a frequency control associated with the clock.

15. The method of claim 9, wherein adjusting the clock includes adjusting the clock at a first point in time and adjusting the clock at a second point in time.

16. A computer program product for adjusting a clock, the computer program product being embodied in a computer readable storage medium and comprising computer instructions for:

obtaining a first plurality of samples and a second plurality of samples associated with a preamble portion of a data packet, wherein the first plurality of samples and the second plurality of samples are sampled using a clock;

determining a first intermediate value based at least in part on the first plurality of samples;

determining a second intermediate value based at least in part on the second plurality of samples;

determining an ending value associated with an end of the preamble portion based at least in part on the first intermediate value and the second intermediate value; and adjusting the clock based at least in part on the ending value without use of a second order timing loop.

17. The computer program product of claim 16, wherein the data packet is stored on magnetic disk storage.

18. The computer program product of claim 16, wherein the computer instructions for determining the ending value include computer instructions for using one or more of the following: linear regression or least mean squares (LMS).

19. The computer program product of claim 16, wherein the computer instructions for determining the ending value include computer instructions for performing phase unwrapping so that a difference between the first intermediate value and the second intermediate value after phase unwrapping is a monotonic increase.

20. The computer program product of claim 16, wherein determining the ending value is further based at least on part on an anticipated time at which the clock is to be adjusted.

21. The computer program product of claim 16, wherein the computer instructions for adjusting the clock include computer instructions for performing one or more of the following: adjusting a phase control associated with the clock or adjusting a frequency control associated with the clock.

22. The computer program product of claim 16, wherein the computer instructions for adjusting the clock include computer instructions for adjusting the clock at a first point in time and adjusting the clock at a second point in time.

* * * * *